US008719380B2

(12) United States Patent
Zhu et al.

(10) Patent No.: US 8,719,380 B2
(45) Date of Patent: May 6, 2014

(54) METHOD AND SYSTEM FOR FACILITATING REMOTE DOWNLOADING

(75) Inventors: Chenxi Zhu, Gaithersburg, MD (US); Wei-Peng Chen, Fremont, CA (US); Takao Naito, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 122 days.

(21) Appl. No.: 12/881,848

(22) Filed: Sep. 14, 2010

(65) Prior Publication Data

US 2012/0066347 A1 Mar. 15, 2012

(51) Int. Cl.
*G06F 15/16* (2006.01)

(52) U.S. Cl.
USPC .......... 709/219

(58) Field of Classification Search
USPC .......... 709/213–219
See application file for complete search history.

(56) References Cited

U.S. PATENT DOCUMENTS 4,916,460 A 4/1990 Powell
5,796,351 A * 8/1998 Yabuki .......... 340/10.6
5,953,325 A 9/1999 Willars
6,757,710 B2 * 6/2004 Reed .......... 709/203
7,006,242 B2 * 2/2006 Smith et al. .......... 358/1.15
7,543,325 B2 6/2009 Westbrook et al.
8,244,867 B2 * 8/2012 Twiss et al. .......... 709/226
2003/0097444 A1 * 5/2003 Dutta et al. .......... 709/225
2003/0121032 A1 * 6/2003 Cho et al. .......... 717/173
2004/0093375 A1 * 5/2004 Mason et al. .......... 709/203
2006/0013197 A1 * 1/2006 Anderson .......... 370/352
2007/0198432 A1 * 8/2007 Pitroda et al. .......... 705/64
2012/0047232 A1 * 2/2012 Hu et al. .......... 709/219

FOREIGN PATENT DOCUMENTS

EP 1 207 656 A2 * 10/2001 .......... H04L 12/28
EP 2 061 195 A1 8/2006
WO WO 01/89155 A1 * 5/2001 .......... H04L 12/28

OTHER PUBLICATIONS

Siavash M. Alamouti, "A Simple Transmit Diversity Technique for Wireless Communications," *IEEE Journal on Select Areas in Communications,* vol. 16, No. 8, Oct. 1998.
Liang Sun et al., "Analytical Performance of MIMO Multichannel Beamforming in the Presence of Unequal Power Cochannel Interference and Noise," *IEEE Transactions on Signal Processing,* vol. 57, No. 7, Jul. 2009.
Shidong Zhou et al., "Distributed Wireless Communication System: A New Architecture for Future Public Wireless Access," *IEEE Communications Magazine,* Mar. 2003.
Wei Feng et al., "Downlink Capacity of Distributed Antenna Systems in a Multi-Cell Environment," © 2009 IEEE.

(Continued)

*Primary Examiner* — Lance L Barry
(74) *Attorney, Agent, or Firm* — Baker Botts L.L.P.

(57) ABSTRACT

A method for facilitating remote downloading includes receiving, at a home media gateway associated with at least a first endpoint, a remote download request generated by a web browser running on the first endpoint. The remote download request is relayed to the home media gateway via at least one component of a wireless service provider's network. The wireless service provider provides user authentication for the remote download request. The remote download request includes an address associated with at least one file hosted by a remote server. The method also includes downloading the at least one file from the remote server to the home media gateway. The method further includes, upon detecting a presence of the first endpoint, uploading the at least one file from the home media gateway to the endpoint.

24 Claims, 2 Drawing Sheets

START
310 GENERATE REMOTE DOWNLOAD REQUEST
320 RECEIVE REMOTE DOWNLOAD REQUEST
330 DOWNLOAD FILE FROM REMOTE SERVER TO HOME MEDIA GATEWAY
340 SEND MESSAGE TO ENDPOINT INDICATING FILE DOWNLOAD IS COMPLETE
350 DETECT PRESENCE OF ENDPOINT
360 DOWNLOAD FILE FROM HOME MEDIA GATEWAY TO ENDPOINT
END

(56) References Cited

OTHER PUBLICATIONS

Wan Choi, et al., "Downlink Performance and Capacity of Distributed Antenna Systems in a Multicell Environment," *IEEE Transactions on Wireless Communications,* vol. 6, No. 1, Jan. 2007.
David Tse et al., "Fundamentals of Wireless Communications," Aug. 13, 2004.
Daniel Perez Palomar et al., "Joint Tx-Rx Beamforming Design for Multicarrier MIMO Channels: A Unified Framework for Convex Optimization," *IEEE Transactions on Signal Processing,* vol. 51, No. 9, Sep. 2003.
Yue Rong et al., "Space-Time Power Schedule for Distributed MIMO Links without Instantaneous Channel State Information at the Transmitting Nodes," *IEEE Transactions on Signal Processing,* vol. 56, No. 2 Feb. 2008.
3GPP TR 36.942 V9.2.0 (Dec. 2009) 3rd Generation Partnership Project; Technical Specification Group Radio Access Network; Evolved Universal Terrestrial Radio Access (E-UTRA); Radio Frequency (RF) System Scenarios; (Release 9).
CPRI Specification V4.1 (Feb. 18, 2009), Common Public Radio Interface (CPRI); Interface Specification.
Gerry Leavey, PMC-Sierra, "Enabling Distributed Base Station Architectures with CPRI," Issue No. 1, Feb. 2006.
"Distributed Antenna System," from Wikipedia, the free encyclopedia, downloaded from http://en.wikipedia.org/wiki/Distributed_Antenna_System, on Sep. 17, 2010.
Zhu et al., "System and Method for Facilitating Remote Downloading," U.S. Appl. No. 12/925,087, filed Oct. 13, 2010.
Intellectual Property Office, London, Search Report dated Dec. 7, 2011 regarding Ref. P117615GB00/TCS, Appln. No. GB1114670.1.
3GPP TS 36.300 V9.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 9); 178 pages.

* cited by examiner

METHOD AND SYSTEM FOR FACILITATING REMOTE DOWNLOADING

TECHNICAL FIELD

The present invention relates generally to downloading, and more particularly to methods and systems for facilitating remote downloading.

BACKGROUND

Mobile endpoints (e.g., smartphones) are generating, downloading, and storing an increasing amount of data. This growth in data consumption is outpacing advances in wireless technologies. Moreover, it is not practical, from a cost or performance perspective, to provide the mobile endpoints with large amounts of on-board storage.

One technique for reducing the local storage requirements of mobile endpoints is to move file downloads off the mobile endpoint and onto a user's home server (e.g., a Samba Server). This technique often requires the user to first setup a server with a network file system (NFS) (e.g., NFS, Microsoft Server Message Block, or Samba) at home. Then, in order to allow the user to remotely access the home server, the user may have to enable remote access to the home server from networks outside of their home. Once configured, the user is then able to save files to the home server over the NFS. In order to save files on the home server, the mobile endpoint downloads a file that it then uploads to the home server over the NFS. While this may reduce the storage requirements of the mobile endpoint, its implementation is inefficient because it requires the data to be moved over both a downlink and uplink in the wireless network. Moreover, the mobile endpoint has to maintain a wireless connection to both download and upload the file. If the connection is dropped during either portion of the download process, the operation fails.

One technique for reducing the load on the wireless network is based on a remote desktop platform. This technique often requires the user to setup and enable the remote desktop function at their home computer. Once enabled the user may remotely operate their computer from their mobile endpoint. While this allows the file to be downloaded using the user's home network connection, trying to manage and interface with a home computer using a mobile endpoint can be unwieldy. For example, the response time of the interactions on the remote desktop is slow because of the substantial amount of messages exchanged between the home computer and the mobile endpoint. As another example, the small screen of a mobile endpoint makes it difficult to operate the higher resolution of the home computer.

SUMMARY

The teachings of the present disclosure relates to methods and systems for facilitating remote downloading that include receiving, at a home media gateway associated with at least a first endpoint, a remote download request generated by a web browser running on the first endpoint. The remote download request is relayed to the home media gateway via at least one component of a wireless service provider's network. The wireless service provider provides user authentication for the remote download request. The remote download request includes an address associated with at least one file hosted by a remote server. The method also includes downloading the at least one file from the remote server to the home media gateway. The method further includes, upon detecting a presence of the first endpoint, uploading the at least one file from the home media gateway to the endpoint.

Technical advantages of particular embodiments include allowing a user to use his endpoint to request his home media gateway to download a file. Accordingly, the traffic load of a wireless service provider's wireless network is reduced. Additionally, the user is not required to maintain a data connection as the file is downloaded.

Other technical advantages will be readily apparent to one of ordinary skill in the art from the following figures, descriptions, and claims. Moreover, while specific advantages have been enumerated above, various embodiments may include all, some, or none of the enumerated advantages.

BRIEF DESCRIPTION OF THE FIGURES

For a more complete understanding of particular embodiments and their advantages, reference is now made to the following description, taken in conjunction with the accompanying drawings, in which.

DETAILED DESCRIPTION

Figure 1:
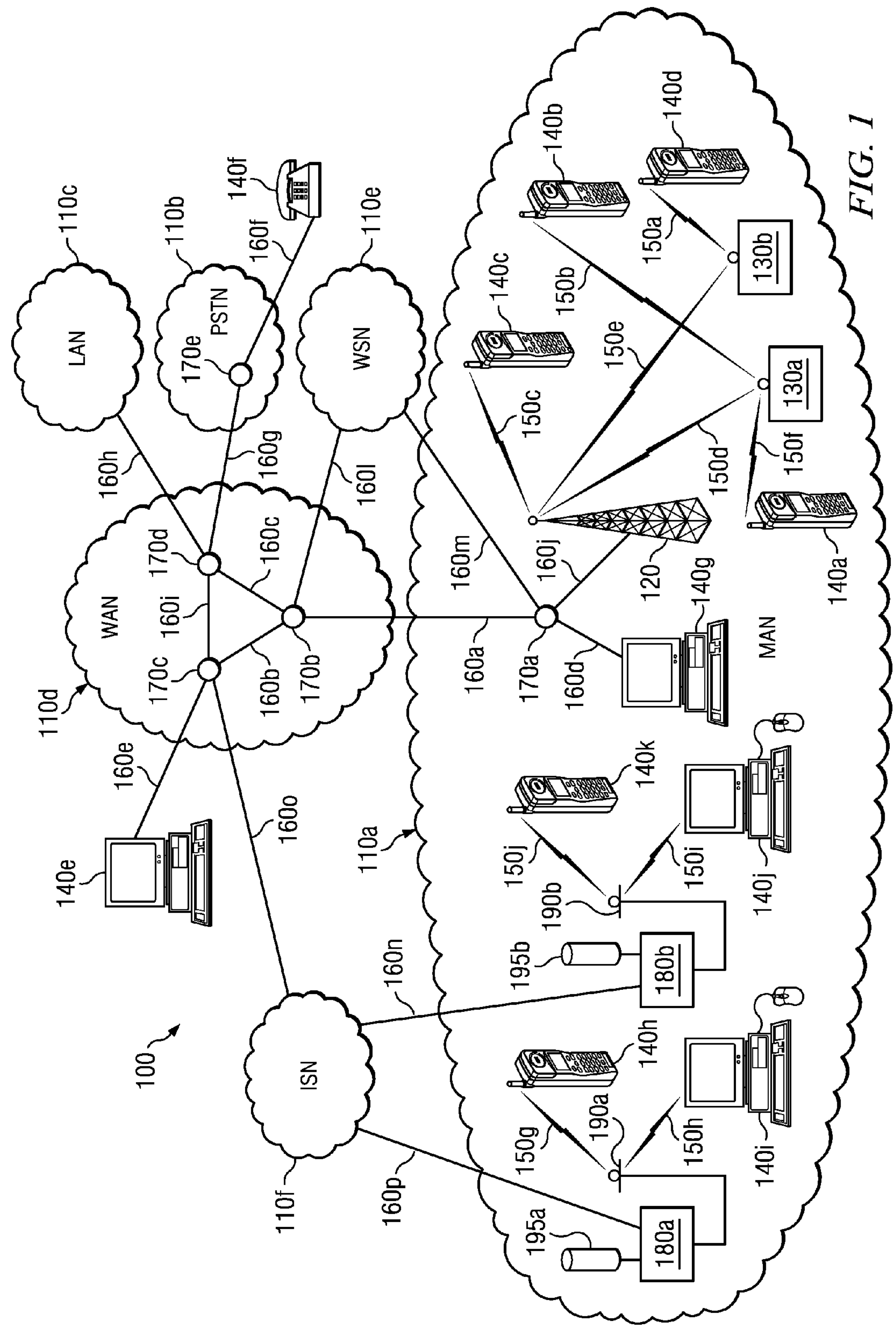
FIG. 1 illustrates a communication system comprising various communication networks, in accordance with a particular embodiment.

FIG. 1 illustrates a communication system comprising various communication networks, in accordance with a particular embodiment. Communication system 100 may be comprised of multiple networks 110. Each network 110 may be any of a variety of communication networks designed to facilitate one or more different services either independently or in conjunction with other networks. For example, networks 110 may facilitate internet access, wireless access (e.g., a WiMAX service) online gaming, data downloading, file sharing, peer-to-peer file sharing (P2P), voice over internet protocol (VoIP) calls, video over IP calls, or any other type of functionality typically provided by a network. Networks 110 may provide their respective services using any of a variety of protocols for either wired or wireless communication. For example, network 110*a* may comprise an 802.16 wireless network (e.g., 802.16j), popularly known as WiMAX, which may include macro base stations (MBSs), such as MBS 120, relay stations (RSs), such as RSs 130, and femto base stations (fBSs), such as fBSs 190.

For simplicity and ease of discussion the remainder of this description may use a simplified nomenclature for the various entities, servers, and networks discussed herein. 'Home location' may refer to a place at which a user has home network access to an external network, such as the internet. A home location is not limited to only a user's residence—it may include, for example, a user's office. 'Home network access' may refer to any of a variety of techniques and/or technologies used to access one or more external networks, such as the internet, from the user's home location. For example, home network access may comprise a cable modem, a digital subscriber line (DSL) modem, an xDSL modem, etc. 'Home network' may refer to a local area network (LAN) configured within a user's home location. The LAN may include both wired and wireless connections. The term 'internet' is not intended to be limited to only the Internet but includes any type of network, including public and private networks, which an fBS may use to establish its backhaul connection to a wireless service provider's network. 'Internet service provider' (ISP) may refer to an entity that provides a user with his home network access service. 'Wireless service' may refer to any of a variety of techniques and technologies (e.g., Worldwide Interoperability for Microwave Access (WiMAX) or Long Term Evolution (LTE)) used to provide endpoints with wireless connections. 'Wireless service provider' (WSP) may refer to the entity that provides the wireless service. 'Wireless network' may refer to any devices or components (e.g., base stations) used to provide the wireless service. 'Mobile wireless network' may refer to the wireless network minus any user equipment that provides wireless service (e.g., a femto base station). In some embodiments, the mobile wireless network may be the publicly available portion of the wireless network. For example, a femto base station at a user's home location may be part of the wireless network, but may not be a part of the mobile wireless network. As another example, a macro base station outside the user's home location may be part of both the wireless network and the mobile wireless network. While this nomenclature is used for simplicity, it does not represent the entire scope of all possible embodiments. For example, an ISP may also be the WSP. As another example, the ISP may not be directly providing the user with internet access (e.g., the ISP may provide a building with internet access, the building owner may then provide the fBS user with internet access).

In particular embodiments, a user may use their mobile endpoint (e.g., endpoint 140*a*) to identify a file to download (e.g., a movie). The file may then either be downloaded locally at mobile endpoint 140*a* or remotely at the user's home media gateway (HMG) (e.g., HMG 195*b*). To download the file, the user's endpoint may send a download request to the HMG via the wireless service provider's network. Because the request is communicated through the WSP's network, the HMG can trust the request without requiring separate user authentication. HMG 195*b* may then use the user's home network access to download the file. When the user returns home and is connected to his home network (e.g., via fBS 190 or 180), the user may then download the file to his endpoint.

The embodiment depicted in FIG. 1 includes fBSs 190. fBSs 190 may, in essence, be small base stations purchased (or leased) by the user from his WSP. Once installed the fBS provides a geographically small coverage area that may be used to enhance the signal coverage within the user's premise. Depending on the scenario, the user may share this coverage with other, unknown users (e.g., the fBS is a public fBS), or he may limit it to known/authorized users (e.g., the fBS is a private fBS). In some embodiments, fBSs 190 may use the same wireless technology as the surrounding base stations 120. In particular embodiments, fBSs 190 may use the same licensed spectrum (e.g., the spectrum licensed by the user's WSP) as the WSP's other local MBSs 120 and RSs 130.

Part of the installation process for the fBS may include providing it with internet access for its backhaul connection. In the scenario depicted in FIG. 1, fBSs 190 are connected to network access devices 180. Network access devices 180 provide their respective users with home network access. The connection between each respective fBS 190 and network access device 180 may provide fBSs 190 with their backhaul connection to the WSP's network (also referred to as a wireless service network (WSN)) network 110*e*.

In the depicted embodiment, HMGs 195 are coupled to network access device 180. Each HMG 195 may use its connection with a respective network access device 180 to download files requested by a user. The downloaded content may be stored locally at HMG 195 or at any other component (e.g., an external hard drive) accessible by HMG 195 that is able to store data. HMG 195 may receive a user's instructions to download the file from, for example, a particular web server. The instructions may be relayed to HMG 195 via, for example, fBS 190, network access device 180, or any other component of the WSP's network. Because the instructions may be sent via fBS 190 (or some other component of the WSP's network), HMG 195 may rely on the WSP's authentication of the user and/or instruction. Thus, the endpoint or user may not have to send authentication information to log into HMG 195. In some embodiments, the instructions may be relayed via the internet.

In particular embodiments, the user of fBS 190 may be the owner of fBS 190 or a user authorized by the owner to use fBS 190. In particular embodiments, those users authorized to use fBS 190, may also be able take advantage of the remote downloading ability of HMG 195. In some embodiments, HMG 195 may have its own list of authorized users, distinct from the list of authorized users associated with fBS 190.

Although the example communication system 100 of FIG. 1 includes six different networks, networks 110*a*-110*f*, the term "network" should be interpreted as generally defining any network or combination of networks capable of transmitting signals, data, and/or messages, including signals, data or messages transmitted through WebPages, e-mail, file transfers, text chat, voice over IP (VoIP), and instant messaging. Depending on the scope, size and/or configuration of the network, any one of networks 110*a*-110*f* may be implemented as a LAN, Wide Area Network (WAN), MAN, PSTN, WiMAX network, global distributed network such as the Internet, Intranet, Extranet, or any other form of wireless or wired networking.

Networks 110 may include any number and combination of wired links 160, wireless connections 150, nodes 170 and/or endpoints 140. For purposes of illustration, and only by way of example, network 110*a* is a MAN that may be implemented, at least in part, via WiMAX, LTE, any 3G or 4G wireless technology, or any other type of wireless service; network 110*b* is a PSTN; network 110*c* is a LAN; network 110*d* is a WAN, such as the internet; network 110*e* is a WSN which may be operated by the WSP responsible for providing network 110*a* with wireless service (e.g., WiMAX); and network 110*f* is an internet service network (ISN) which may be operated by the ISP responsible for providing its users with home network access, including internet access. Though not depicted in FIG. 1, both WSN network 110*e* and ISN network 110*f* may include servers, modems, gateways and any other components that may be needed to provide their respective service.

While networks 110 have been depicted as six separate networks, depending on the scenario any two, or more, of the networks may be a single network. For example, the WSP and the ISP may be the same business entity which may maintain the necessary components for both services on the same network thus merging ISN network 110*f* and WSN network 110*e* into a single network. Furthermore, the interconnections between networks 110 may vary from those depicted in FIG. 1. For example, if a user uses a Digital Subscriber Line (DSL) connection for his internet access, his network access device 180 may connect to PSTN 110*b*.

Generally, networks 110 provide for the communication of packets, cells, frames, or other portions of information (generally referred to as packets herein) between endpoints 140 and/or nodes 170 (described below). In particular embodiments, networks 110*a*, and 110*c*-110*f* may be IP networks. IP networks transmit data by placing the data in packets and sending each packet individually to the selected destination, along one or more communication paths. Network 110*b* may, for example, be a PSTN that may include switching stations, central offices, mobile telephone switching offices, pager switching offices, remote terminals, and other related telecommunications equipment that are located throughout the world. Network 110*d* may be coupled to network 110*b* through a gateway. Depending on the embodiment, the gateway may be a part of network 110*b* and/or 110*d* (e.g., nodes 170*e* and/or 170*c* may comprise a gateway). The gateway may allow PSTN 110*b* to be able to communicate with non-PSTN networks such as any one of networks 110*a* or 110*c*-110*f*.

Any of networks 110*a* or 110*c*-110*f* may be coupled to other IP networks including, but not limited to, the Internet. Because IP networks share a common method of transmitting data, signals may be transmitted between devices located on different, but interconnected, IP networks. In addition to being coupled to other IP networks, any of networks 110*a* or 110*c*-110*f* may also be coupled to non-IP networks through the use of interfaces or components such as gateways.

Networks 110 may be connected to each other and with other networks via a plurality of wired links 160, wireless connections 150, and nodes 170. Not only do wired links 160, wireless connections 150, and nodes 170 connect various networks but they also interconnect endpoints 140 with one another and with any other components coupled to or a part of any of networks 110. The interconnection of networks 110 may enable endpoints 140 to communicate data and control signaling between each other as well as allowing any intermediary components or devices to communicate data and control signals. Accordingly, users of endpoints 140 may be able to send and receive data and control signals between and among each network component coupled to one or more of networks 110.

In the depicted embodiment, wireless connections 150 may represent wireless links between two components using, for example, WiMAX. In other embodiments, wireless connections 150 may use other wireless technologies and/or protocols, such as LTE or LTE Advanced (LTE-A). The extended range of a WiMAX MBS, along with one or more RSs and fBSs, may allow network 110*a* to cover the larger geographic area associated with a MAN.

Nodes 170 may include any combination of network components, modems, session border controllers, gatekeepers, ISN gateways, WSN gateways, security gateways, operation administration maintenance and provisioning (OAM&P) servers, network access provider (NAP) servers, base stations, conference bridges, routers, hubs, switches, gateways, endpoints, or any other hardware, software, or embedded logic implementing any number of communication protocols that allow for the exchange of packets in communication system 100. For example, node 170*e* may comprise a gateway. As a gateway node 170*e* may allow network 110*b*, a PSTN network, to be able to transmit and receive communications from other non-PSTN networks, such as network 110*d*, an IP network. More specifically, as a gateway, node 170*e* may translate communications between the various protocols used by networks 110*b* and 110*d*.

Network access devices 180 may provide home network access to fBSs 190 and HMG 195 through any combination of hardware, software embedded in a computer readable medium, and/or encoded logic incorporated in hardware or otherwise stored (e.g., firmware). In some embodiments, network access device 180 may be supplied by the user's ISP. For example, if the user's ISP is a cable company then the ISP may supply a cable modem as network access device 180. As another example, if the user's ISP is a phone company then the ISP may supply an xDSL modem as network access device 180. As may be apparent, network access device 180 may provide home network access to components other than fBSs 190 and HMG 195. For example, the user may connect his personal computer to network access device 180 to access the internet.

Endpoints 140 and/or nodes 170 may provide data or network services to a user through any combination of hardware, software embedded in a computer readable medium, and/or encoded logic incorporated in hardware or otherwise stored (e.g., firmware). For example, endpoints 140*a*-140*k* may include a cell phone, an IP telephone, a computer, a video monitor, a camera, a personal data assistant or any other hardware, software and/or encoded logic that supports the communication of packets (or frames) using one or more of networks 110. Endpoints 140 may also include unattended or automated systems, gateways, other intermediate components or other devices that can send or receive data and/or signals.

Although FIG. 1 illustrates a particular number and configuration of endpoints, connections, links, and nodes, communication system 100 contemplates any number or configuration of such components for communicating data. In addition, elements of communication system 100 may include components centrally located (local) with respect to one another or distributed throughout communication system 100.

Figure 2:
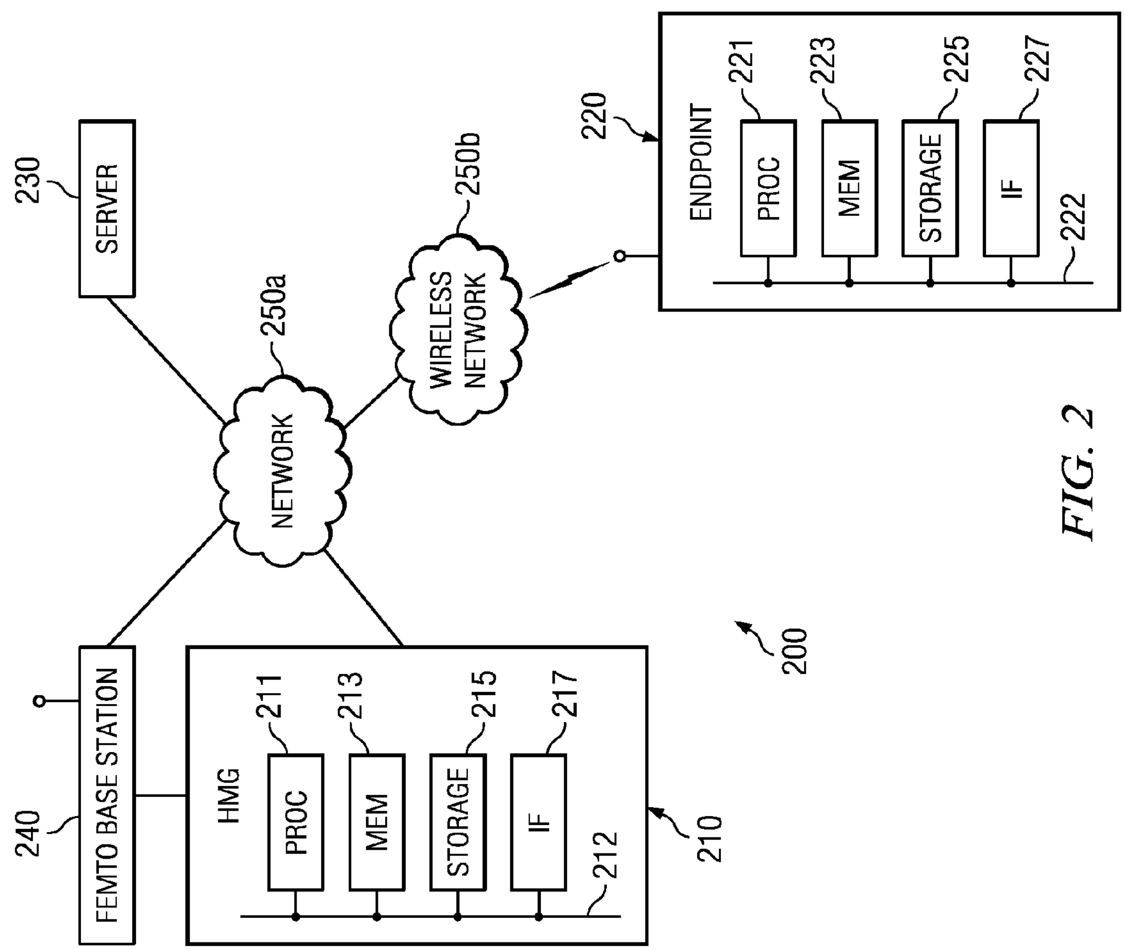
FIG. 2 illustrates a network comprising a more detailed view of an endpoint, and a home media gateway, in accordance with a particular embodiment.

FIG. 2 illustrates a network comprising a more detailed view of an endpoint, and a HMG, in accordance with a particular embodiment. The depicted embodiment is a simplified scenario comprising networks 250, HMG 210, fBS 240 and endpoint 220. In different embodiments network 200 may comprise any number of wired or wireless networks, MBSs, endpoints, RSs, fBSs, and/or any other components that may facilitate or participate in the communication of data and/or signals whether via wired or wireless connections. Network 200 may comprise any of a variety of different wireless technologies, including, but not limited to, orthogonal frequency division multiple access (OFDMA), next generation wireless system such as LTE-A and 802.16m.

HMG 210 and endpoint 220 may each include one or more portions of one or more computer systems. In particular embodiments, one or more of these computer systems may perform one or more steps of one or more methods described or illustrated herein. In particular embodiments, one or more computer systems may provide functionality described or illustrated herein. In some embodiments, encoded software running on one or more computer systems may perform one or more steps of one or more methods described or illustrated herein or provide functionality described or illustrated herein.

The components of HMG 210 and endpoint 220 may comprise any suitable physical form, configuration, number, type and/or layout. As an example, and not by way of limitation, HMG 210 and/or endpoint 220 may comprise an embedded computer system, a system-on-chip (SOC), a single-board computer system (SBC) (such as, for example, a computer-on-module (COM) or a system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, HMG 210 and/or endpoint 220 may include one or more computer systems; be unitary or distributed; span multiple locations; span multiple machines; or reside in a cloud, which may include one or more cloud components in one or more networks.

Where appropriate, HMG 210 and/or endpoint 220 may perform without substantial spatial or temporal limitation one or more steps of one or more methods described or illustrated herein. As an example, and not by way of limitation, HMG 210 and/or endpoint 220 may perform in real time or in batch mode one or more steps of one or more methods described or illustrated herein. One or more HMGs and/or endpoints may perform at different times or at different locations one or more steps of one or more methods described or illustrated herein, where appropriate.

In the depicted embodiment, HMG 210 and endpoint 220 may each include their own respective processors 211 and 221, memory 213 and 223, storage 215 and 225, interfaces 217 and 227, and buses 212 and 222. These components may work together to facilitate in the remote downloading of one or more files. Although a particular network is depicted having a particular number of particular components in a particular arrangement, this disclosure contemplates any suitable network 200 having any suitable number of any suitable components in any suitable arrangement. For simplicity, similar components of HMG 210 and endpoint 220 will be discussed together wherein the components of endpoint 220 will be identified in parenthesis. However, it is not necessary for both devices to have the same components, or the same type of components. For example, processor 211 may be a general purpose microprocessor and processor 221 may be an application specific integrated circuit (ASIC).

Processor 211 (and/or 221) may be a microprocessor, controller, or any other suitable computing device, resource, or combination of hardware, software and/or encoded logic operable to provide, either alone or in conjunction with other components (e.g., memory 213 or 223, respectively), remote downloading functionality. Such functionality may include providing various features discussed herein. For example, processor 221 may determine when to download a file locally at endpoint 220, and when to have the file downloaded remotely at HMG 210. Additional examples and functionality provided, at least in part, by processor 211 (and/or 221) will be discussed below.

In particular embodiments, processor 211 (and/or 221) may include hardware for executing instructions, such as those making up a computer program. As an example and not by way of limitation, to execute instructions, processor 211 (and/or 221) may retrieve (or fetch) instructions from an internal register, an internal cache, memory 213 (and/or 223), or storage 215 (and/or 225); decode and execute them; and then write one or more results to an internal register, an internal cache, memory 213 (and/or 223), or storage 215 (and/or 225).

In particular embodiments, processor 211 (and/or 221) may include one or more internal caches for data, instructions, or addresses. This disclosure contemplates processor 211 (and/or 221) including any suitable number of any suitable internal caches, where appropriate. As an example and not by way of limitation, processor 211 (and/or 221) may include one or more instruction caches, one or more data caches, and one or more translation lookaside buffers (TLBs). Instructions in the instruction caches may be copies of instructions in memory 213 (and/or 223) or storage 215 (and/or 225) and the instruction caches may speed up retrieval of those instructions by processor 211 (and/or 221). Data in the data caches may be copies of data in memory 213 (and/or 223) or storage 215 (and/or 225) for instructions executing at processor 211 (and/or 221) to operate on; the results of previous instructions executed at processor 211 (and/or 221) for access by subsequent instructions executing at processor 211 (and/or 221), or for writing to memory 213 (and/or 223), or storage 215 (and/or 225); or other suitable data. The data caches may speed up read or write operations by processor 211 (and/or 221). The TLBs may speed up virtual-address translations for processor 211 (and/or 221). In particular embodiments, processor 211 (and/or 221) may include one or more internal registers for data, instructions, or addresses. Depending on the embodiment, processor 211 (and/or 221) may include any suitable number of any suitable internal registers, where appropriate. Where appropriate, processor 211 (and/or 221) may include one or more arithmetic logic units (ALUs); be a multi-core processor; include one or more processors 211 (and/or 221); or any other suitable processor.

Memory 213 (and/or 223) may be any form of volatile or non-volatile memory including, without limitation, magnetic media, optical media, random access memory (RAM), read-only memory (ROM), flash memory, removable media, or any other suitable local or remote memory component or components. Memory 213 (and/or 223) may store any suitable data or information utilized by HMG 210 (and/or endpoint 220), including software embedded in a computer readable medium, and/or encoded logic incorporated in hardware or otherwise stored (e.g., firmware). In particular embodiments, memory 213 (and/or 223) may include main memory for storing instructions for processor 211 (and/or 221) to execute or data for processor 211 (and/or 221) to operate on. As an example and not by way of limitation, HMG 210 (and/or endpoint 220) may load instructions from storage 215 (and/or 225) or another source (such as, for example, another computer system, another base station, or a remote transceiver) to memory 213 (and/or 223). Processor 211 (and/or 221) may then load the instructions from memory 213 (and/or 223) to an internal register or internal cache. To execute the instructions, processor 211 (and/or 221) may retrieve the instructions from the internal register or internal cache and decode them. During or after execution of the instructions, processor 211 (and/or 221) may write one or more results (which may be intermediate or final results) to the internal register or internal cache. Processor 211 (and/or 221) may then write one or more of those results to memory 213 (and/or 223). In particular embodiments, processor 211 (and/or 221) may execute only instructions in one or more internal registers or internal caches or in memory 213 (and/or 223) (as opposed to storage 215 (and/or 225) or elsewhere) and may operate only on data in one or more internal registers or internal caches or in memory 213 (and/or 223) (as opposed to storage 215 (and/or 225) or elsewhere).

Bus 212 (and/or 222) may include any combination of hardware, software embedded in a computer readable medium, and/or encoded logic incorporated in hardware or otherwise stored (e.g., firmware) to couple components of HMG 210 (and/or endpoint 220) to each other. As an example and not by way of limitation, bus 212 (and/or 222) may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212 (and/or 222) may include any number, type, and/or configuration of buses 212 (and/or 222), where appropriate. In particular embodiments, one or more buses 212 (which may each include an address bus and a data bus) may couple processor 211 (and/or 221) to memory 213

(and/or 223). Bus 212 (and/or 222) may include one or more memory buses, as described below. In particular embodiments, one or more memory management units (MMUs) may reside between processor 211 (and/or 221) and memory 213 (and/or 223) and facilitate accesses to memory 213 (and/or 223) requested by processor 211 (and/or 221). In particular embodiments, memory 213 (and/or 223) may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 (and/or 223) may include one or more memories 213 (and/or 223), where appropriate.

In particular embodiments, storage 215 (and/or 225) may include mass storage for data or instructions. As an example and not by way of limitation, storage 215 (and/or 225) may include an HDD, a floppy disk drive, flash memory, an optical disc, a magneto-optical disc, magnetic tape, or a Universal Serial Bus (USB) drive or a combination of two or more of these. Storage 215 (and/or 225) may include removable or non-removable (or fixed) media, where appropriate. Storage 215 (and/or 225) may be internal or external to HMG 210 (and/or endpoint 220), where appropriate. In particular embodiments, storage 215 (and/or 225) may be non-volatile, solid-state memory. In particular embodiments, storage 215 (and/or 225) may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 (and/or 225) may take any suitable physical form and may comprise any suitable number or type of storage. Storage 215 (and/or 225) may include one or more storage control units facilitating communication between processor 211 (and/or 221) and storage 215 (and/or 225), where appropriate.

In particular embodiments, interface 217 (and/or 227) may include hardware, encoded software, or both providing one or more interfaces for communication (such as, for example, packet-based communication) between HMG 210, endpoint 220, fBS 240, any networks, any network devices, and/or any other computer systems. As an example and not by way of limitation, communication interface 217 (and/or 227) may include a network interface controller (NIC) or network adapter for communicating with an Ethernet or other wire-based network and/or a wireless NIC (WNIC) or wireless adapter for communicating with a wireless network.

In some embodiments, interface 217 (and/or 227) may comprise one or more radios coupled to one or more antennas. In such an embodiment, interface 217 (and/or 227) may receive digital data that is to be sent out to wireless devices, such as endpoints, via a wireless connection. The radio may convert the digital data into a radio signal having the appropriate center frequency, bandwidth parameters, and transmission power. Similarly, the radios may convert radio signals received via the antenna into digital data to be processed by, for example, processor 211 (and/or 221).

Depending on the embodiment, interface 217 (and/or 227) may be any type of interface suitable for any type of network. As an example and not by way of limitation, interface 217 (and/or 227) may be used to communicate with an ad-hoc network, a personal area network (PAN), a local area network (LAN), a wide area network (WAN), a metropolitan area network (MAN), or one or more portions of the internet or a combination of two or more of these. One or more portions of one or more of these networks may be wired or wireless. As an example, HMG 210 (and/or endpoint 220) may communicate with a wireless PAN (WPAN) (such as, for example, a BLUETOOTH WPAN), a Wi-Fi network, a WiMAX network, an LTE network, an LTE-A network, a cellular telephone network (such as, for example, a Global System for Mobile Communications (GSM) network), or any other suitable wireless network or a combination of two or more of these. HMG 210 (and/or endpoint 220) may include any suitable interface 217 (and/or 227) for any one or more of these networks, where appropriate.

In some embodiments, interface 217 (and/or 227) may include one or more interfaces for one or more I/O devices. One or more of these I/O devices may enable communication between a person and HMG 210 (and/or endpoint 220). As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Particular embodiments may include any suitable type and/or number of I/O devices and any suitable type and/or number of interfaces 117 (and/or 227) for them. Where appropriate, interface 117 (and/or 227) may include one or more device or encoded software drivers enabling processor 211 (and/or 221) to drive one or more of these I/O devices. Interface 117 (and/or 227) may include one or more interfaces 117 (and/or 227), where appropriate.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

Particular embodiments may include one or more non-transitory computer-readable storage media implementing any suitable storage. In particular embodiments, a computer-readable storage medium implements one or more portions of processor 211 (and/or 221) (such as, for example, one or more internal registers or caches), one or more portions of memory 213 (and/or 223), one or more portions of storage 215 (and/or 225), or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Networks 250 may comprise any number of separate but interconnected networks operated by one or more different operators. For example, network 250*a* may comprise the ISP's network and network 250*b* may comprise the WSP's network. A user may use their ISP's network for their home network access at their home location. In providing the user with home network access, the ISP's network may include modems, servers, and gateways (e.g., an ISP gateway). A user may use their WSP's wireless network to supply the user with his wireless service. The wireless network may support technologies and/or protocols such as a WiMAX, LTE-A, or LTE. In providing the wireless service, the WSP's network may utilize servers and gateways. One or more components of network 250*b* may provide authentication and/or authorization for endpoint 220. HMG 210 may take advantage of this authentication by not requiring the user to send separate or additional authentication information. Networks 250 may comprise any number of additional networks including, but not limited to, the internet, a LAN, WAN, MAN, PSTN or some combination of the above.

fBS 240 may, in essence, be a small base station providing a limited coverage area for a home or office. Depending on the embodiment and configuration of fBS 240 it may be public or private. fBS 240 may rely on the user's home network access (e.g., via a modem, not depicted, provided by the user's ISP) to provide the backhaul connection to the WSP's network. In certain embodiments, HMG 210 and fBS 240 may comprise a single device. For example, a WSP may lease to a user fBS 240 with HMG 210 integrated therein. The combined device may provide the user with base station like wireless coverage for the user's home, and the remote downloading functionality of HMG 210. HMG 210 may be integrated in any of a variety of home gateway related products including wireline routers, Wi-Fi (802.11) access points, WiMAX (802.16) femtocell base station, 2G/3G/LTE femtocell base station, network access device, home storage system, etc.

Server 230 may comprise any combination of hardware and/or encoded logic or software, including firmware, needed to host files for downloading. Server 230 may use any one or more of a variety of access control methods to limit user access to available files. The method used may impact the type of request and set of credentials needed to access content hosted by server 230. For example, one common security method used for access control is Hypertext Transfer Protocol Secure (HTTPS). For HMG 210 to be able to download a file from server 230 using HTTPS, storage 215 of HMG 210 may need to store information such as a session ID, a random number, a cipher suite, server 230's public key, and any other information needed to successfully gain access to server 230's content.

The following examples may help to illustrate how these components inter-work with one another to provide the functionality of particular embodiments. Assume that while a user is traveling away from his home location, the user is using a web browser running on their endpoint to search for movies. Once the user finds a movie to watch, the movie may be downloaded and saved at the user's HMG 210. In some embodiments, endpoint 220 may receive a message indicating that HMG 210 has finished downloading the movie. When the user returns to his home location, the movie will be ready for use. For example, the user may watch the movie at home or download the movie to endpoint 220 using a relatively fast connection (e.g., a wired or wireless link such as Ethernet, USB, or Wi-Fi), as compared to the wireless connection provided by the mobile wireless network while the user is away from his home location. While this example is focused on a movie, remote downloading may be used for any file to be downloaded, including, for example, system software upgrades for endpoint 220. In some embodiments, the file being downloaded to HMG 210 may comprise files hosted by the WSP that the user is able to select using the user's subscription account (e.g., transactions at the WSP's media store may be carried out within the WSP's network thus providing a secure shopping experience).

Downloading the file to HMG 210 from server 230 may be achieved through a variety of techniques. For example, in some embodiments, storage 217 may store a proxy program that processor 211 may execute to allow HMG 210 to accept connections from endpoint 220 when endpoint 220 is outside the coverage area of the user's home network. In certain embodiments, HMG 210 may not need login information from endpoint 220 because HMG 210 may rely on the user authentication provided by the WSP. In some embodiments, the proxy program may be installed at fBS 240, an access point or a computer inside the user's home network. The proxy program may work in concert with a plug-in that is maintained in storage 225 of endpoint 220. Processor 221 may run the plug-in to intercept, reformat and redirect at least some download requests (e.g., requests for files greater than a threshold number of bytes) made from the user's browser. The intercepted requests may be directed through the WSP's network to the proxy program running on HMG 210.

In particular embodiments, a user may decide whether or not to send a request to HMG 210. For example, when processor 221 recognizes that a user is attempting to download a file, endpoint 220 may generate a prompt asking the user if the file should be downloaded locally or at HMG 210. Depending on the embodiment, the prompt may be generated automatically (e.g., anytime a user attempts to download any file, any file over a certain size, or a particular file type) or based on user input (e.g., a user presses a button on endpoint 220 to call up the prompt). The prompt may be a menu entry, a pop-up window, a new page, or any other type of prompt. For example, in some embodiments, a user may press a button that calls for a popup menu with an option to "save link to home" in addition to, or instead of an option to "save link as." In some embodiments, processor 221 may generate a new hyper-link within the webpage, as displayed by endpoint 220's browser. For example, a webpage provided by server 230 may comprise a hyperlink to download a movie. Processor 221 may recognize that the hyperlink is to download a movie and may, when rendering the webpage, add a second hyperlink proximate to the original hyperlink. The new hyperlink may be distinct from the original hyperlink so as to alert the user that selecting the second hyperlink will download the movie to storage 217 of HMG 210 and selecting the original hyperlink will download the movie locally to storage 227 of endpoint 220.

Once it has been determined that a file is to be downloaded by HMG 210, endpoint 220 may, instead of sending a request to server 230, send a request to the proxy program run by HMG 210. The request may include the user's security credentials and/or any log-in information needed to access and/or download the requested file from server 220. In some embodiments, the request may be sent to HMG 210 without the user first logging into HMG 210. For example, HMG 210 may rely on the user authentication provided by the WSP and/or the WSP's network. In particular embodiments, storage 215 of HMG 210 may maintain at least some of the user's credentials, thus the request from endpoint 220 may not contain all the credentials needed to download files from server 230. In some embodiments, the request may comprise a format similar to the following plain English syntax: "Please download the file xxx at url y.y.y, and store it at the home directory zzz."

When HMG 210 receives a request from endpoint 220 to download a file from server 230, interface 217 may send a request (e.g., an HTTP request) to server 230 requesting the file for download. The request may include information provided by endpoint 220 and/or information stored by storage 215. After server 230 accepts the request from HMG 210, HMG 210 may start to download the file on behalf of endpoint 220. In some embodiments, once the download is complete, interface 217 of HMG 210 may send a message to endpoint 220 indicating that the file has been successfully downloaded.

When the user returns home, endpoint 220 may be able to access the file downloaded by HMG 210 via a wireline or wireless link, such as Ethernet, USB, Bluetooth, Wi-Fi, WiMAX, or LTE. The download from HMG 210 to endpoint 220 may be completed without endpoint 220 using the resources of the mobile wireless network. The download time from HMG 210 to endpoint 220 may be much shorter than the download time using a MBS's wireless connection from the mobile wireless network. Depending on the embodiment, the file may be downloaded from HMG 210 to endpoint 220 as soon as endpoint 220 has a connection to HMG 210, after endpoint 220 or HMG 210 receive a request to download the file from HMG 210 to endpoint 220, at a predetermined or scheduled time, at any other convenient or suitable time, or after any convenient or suitable triggering event.

In some scenarios and/or embodiments, HMG 210 may need user credentials in order to access or download a file from server 230. These credentials may be provided by endpoint 220 over a secure connection. For example, in some embodiments, an Internet Protocol Security (IPSec) connection may be established between endpoint 220 and HMG 210. When a user requests that HMG 210 download a file, endpoint 220 may use the secure connection to send the user's credentials to HMG 210. In some embodiments, the request may comprise a format similar to the following plain English syntax: "Please use username uuu and password ppp to download file xxx at url y.y.y, and store it at directory zzz."

In some cases, a certificate may be needed during the first connection to server 230 to authenticate the identity of the user. In such cases, it may be that HMG 210 (or the proxy program running thereon) sends its own certificate along with the user's username and/or password to server 230. In particular embodiments, processor 211 of HMG 210 may be able to parse the response messages from server 230 so as to reply with the correct responses. This may allow the proxy program to behave like a client browser, thus server 230 may be unaware that it is communicating with a proxy program.

In certain embodiments, if server 230 requires information that HMG 210 and/or the proxy program are unable to provide (e.g., a web site that asks additional security questions if it receives an HTTP request from an unfamiliar IP address or without a proper cookie), interface 217 may transmit a message to endpoint 220. The message may be transmitted via the secure connection. Depending on the nature or type of information that is needed, the user may send additional information to HMG 210 from endpoint 220 or the user may wait until they are at their home location and then connect to server 230 from their home computer to manually entering the information needed by server 230.

In some embodiments, HMG 210 may be an integrated component of fBS 240. In many situations, the WSP may lease fBS 240 to a user while keeping fBS 240 as part of the WSP's infrastructure. This may prevent fBS 240, and HMG 210, from being accessible by the user directly through the internet. In such a scenario, the WSP may provide the user with limited access to fBS 240 through the WSP's network. This access through the WSP's network **250*b* may increase the trust between HMG 210 and requests from endpoint 220. A similar trust may be established in certain embodiments in which HMG 210 is connected to fBS 240**.

In particular embodiments, HMG 210 may be configured so that the proxy program run by HMG 210 is able to use the same authentication credentials (e.g., security keys, password, cookies, digital signatures, etc) as endpoint 220. In certain embodiments, the authentication credentials may be synchronized between endpoint 220 and HMG 210 when endpoint 220 is connected to HMG 220 in a secure way (e.g., through the user's home network). In some scenarios, the user may be able to set a policy on how the credentials are synchronized, maintained and/or deleted.

In some embodiments where fBS 240 and/or HMG 210 are only accessible through the WSP's network, the WSP may provide a relay feature to allow endpoint 220 to send/receive messages to/from fBS 240 and/or HMG 210. In particular embodiments, a control-node (e.g., a Mobility Management Entity (MME)) associated with the WSP's network may register the address of fBS 240 and/or HMG 210. Once registered, the user may then be able to remotely send download requests to HMG 210. The request may be sent, for example, through the WSP's network (as opposed to through the internet) using the relay feature and the registered address of fBS 240 and/or HMG 210. HMG 210 may then download the requested file via the user's home network access. Because the request is transmitted through the WSP's network, it may be more secure than having the request sent via the internet. While the request is transmitted primarily through the WSP's network, the majority of the traffic (e.g., the downloaded file) does not go through the mobile operator's network nor use resources of the mobile wireless network.

Thus far several different embodiments and features have been presented. Particular embodiments may combine one or more of these features depending on operational needs and/or component limitations. This may allow for great adaptability of network 200 to the needs of various organizations and users. For example, in particular embodiments, HMG 210 may be combined with fBS 240. Some embodiments may include additional or different features. In particular embodiments, the functionality of HMG 210 may be a part of any home gateway equipment, including a router with Ethernet or Wi-Fi access, a LTE HeNB (Home eNodeB), or WiMAX femto base station. Moreover, the ability to remotely download files may be implemented in any time of wireless technology.

Figure 3:
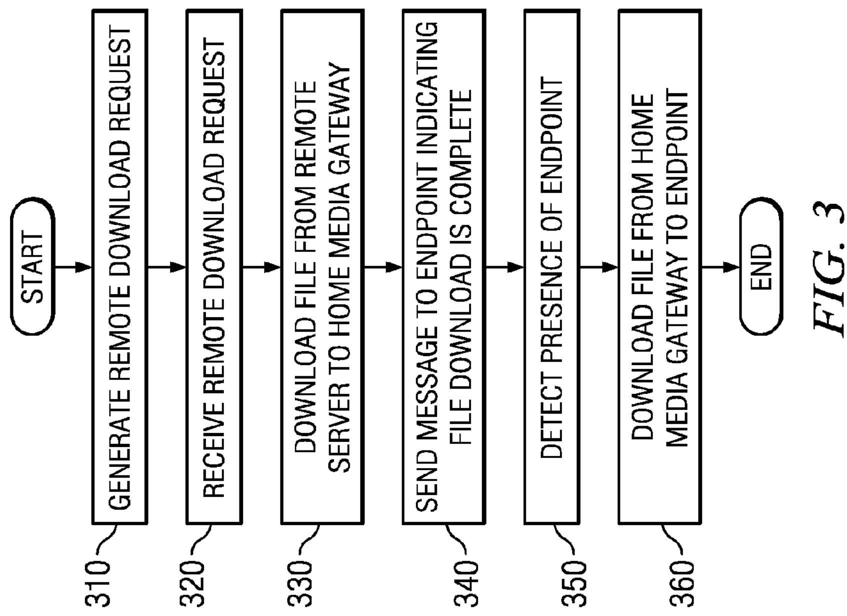
FIG. 3 illustrates a method for facilitating remote downloading, in accordance with a particular embodiment.

FIG. 3 illustrates a method for facilitating remote downloading, in accordance with a particular embodiment. It may be assumed, for purposes of this method, that a user has a fBS and/or a HMG that are able to access external networks, including the internet and/or the WSP's network, via the user's home network access. The user's home network access may be provided via a modem provided by an ISP.

The method begins at step 310 with the generation of a remote download request. The download request may be generated by an endpoint. For example, a user may be browsing a website comprising movie downloads. When a user identifies a movie to be downloaded, the user may direct the endpoint to have the file downloaded to the user's HMG. In some embodiments, the endpoint may automatically generate the request any time a user selects a large file (e.g., a file greater than a threshold number of bits) or when the downloading of the file will take a long time (e.g., exceeds a threshold amount of time based, for example, on file size and available bandwidth). In some embodiments, the request may be generated based on an explicit indication received from a user. In some embodiments or scenarios, the request may be generated by a component or device within the WSP's network. For example, in issuing a software update for the endpoint, a component of the WSP's may generate the remote download request to have the HMG download the software update. In some embodiments or scenarios, the request may be generated by a third-party component. For example, the user may have a subscription to one or more online magazines, newspapers, podcasts, or other content. As another example, the user may use the HMG as a social networking port for non-urgent updates. A download request may be generated whenever new content is available for either a subscription or from a social networking port. The above of are just a few examples of instances where it may be suitable to have a HMG download a file on behalf of a user, and then upload the file to the endpoint.

At step 320 the user's HMG receives the remote download request. The request may be received via the WSP's network. This may allow the HMG to take advantage of the user authentication performed by the WSP and/or the WSP's network. The remote download request may include at least an address associated with a server and/or file to be downloaded by the HMG. In particular embodiments and/or scenarios, the remote download request may include the user's login information and/or security credentials for access to the server and/or its contents. Compared to downloading the file, sending the remote download request results in only a small amount of data being sent over the mobile wireless network. In addition, because the endpoint's involvement in the downloading of the file from the server essentially ends with the sending of the request, the endpoint need not stay connected to the wireless network while the file is downloaded to the HMG.

At step 330 the HMG downloads the file from the server specified in the remote download request. In downloading the file, the HMG may use the user's home network access. Downloading the file to the HMG via the user's home network access may reduce the traffic demands placed on the mobile wireless network. In some embodiments, the HMG may wait until a scheduled time of day before it downloads the file from the server.

At step 340 a message is sent to the endpoint indicating that the file has been downloaded. The message may be sent in any of a variety of ways, including, but not limited to, email, text message, voice mail, instant message, an audible tone, a pop-up window, an alert window, or any other way which may alert a user that the HMG has finished downloading the requested file.

At step 350 the endpoint's presence is detected by the HMG. This may comprise the endpoint being connected directly to the HMG or to a router or switch that is also connected to the HMG, or this may comprise the endpoint having established a wireless connection (e.g., Wi-Fi, LTE, WiMAX, etc.) between, for example, the endpoint and the HMG, the fBS, or a Wi-Fi access point. In some embodiments, the endpoint's presence may not be detected until the endpoint explicitly signals to the HMG that it is ready to download the file. For example, the user may select an option or press a button on the endpoint to request the file be downloaded from the HMG to the endpoint. In some embodiments the file may be downloaded whenever the user syncs his endpoint.

At step 360 the file is downloaded from the HMG to the endpoint. The downloading may be done using any of a variety of techniques, interfaces and/or mediums. For example, the file may be downloaded to the endpoint using the same wireless interface that the endpoint uses to communicate within the WSP's wireless network (e.g., a LTE wireless interface). As another example, the endpoint may download the file using a different wireless interface, such as a Wi-Fi connection. As another example, the file may be downloaded using a wired interface, such as Ethernet or USB, either directly or indirectly with the HMG. The file may be downloaded to the endpoint automatically or upon request from the endpoint. For example, the endpoint may begin to download the file once it is connected to the user's home network. As another example, the endpoint may wait until a scheduled time of day to download the file.

Although particular embodiments have been described in detail, it should be understood that various other changes, substitutions, and alterations may be made hereto without departing from the spirit and scope of particular embodiments. For example, while the embodiment depicted in FIG. 3 includes a certain number of steps, depicted in a certain order, it is to be understood that other embodiments may have more, fewer or different steps, and the steps may be rearranged. For example, in some embodiments the HMG may not send a message to the endpoint indicating that the file has been downloaded, or the message may be sent after the endpoints presence has been detected.

As another example, although an embodiment has been described with reference to a number of elements included within communication system 100 such as endpoints, fBSs, MBS, and RSs, these elements may be combined, rearranged or positioned in order to accommodate particular routing architectures or needs. In addition, any of these elements may be provided as separate external components to communication system 100 or each other where appropriate. Particular embodiments contemplate great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed:

1. A method of facilitating remote downloading, comprising:

receiving, at a home media gateway associated with at least a first endpoint, a remote download request generated by a web browser running on the first endpoint and relayed to the home media gateway via at least one component of a wireless service provider's network, the remote download request received through a wireless service provider network control signaling connection established between the home media gateway and the first endpoint, the wireless service provider providing user authentication for the remote download request, the remote download request comprising an address associated with at least one file hosted by a remote server;

receiving, by the home media gateway, the at least one file from the remote server; and upon detecting a presence of the first endpoint, sending the at least one file from the home media gateway to the first endpoint.

2. The method of claim 1, further comprising, upon completing the receiving of the at least one file, sending a message to the endpoint indicating that the home media gateway has completed receiving the at least one file.

3. The method of claim 1, wherein:

the remote download request is received from the first endpoint while the first endpoint is away from a home location and using a wireless connection; and the at least one file is received at the home location via a network access connection associated with a user of the first endpoint, the network access connection different than the wireless connection.

4. The method of claim 1, wherein the remote download request comprises security credentials associated with the remote server.

5. A method of facilitating remote downloading, comprising:

receiving, by a first endpoint, a request to download at least one file from a remote server;

generating from a web browser of the first endpoint a remote download request comprising an address associated with the at least one file;

transmitting, by the first endpoint, the remote download request to a home media gateway via at least one component of a wireless service provider's network, the remote download request transmitted through a wireless service provider network control signaling connection established between the home media gateway and the first endpoint, the wireless service provider providing the user authentication for the remote download request; and receiving, by the first endpoint, the at least one file from the home media gateway.

6. The method of claim 5, wherein the remote download request further comprises security credentials.

7. The method of claim 5, further comprising determining that a time to receive the at least one file exceeds a first threshold.

8. The method of claim 5, wherein receiving the at least one file comprises receiving the at least one file from the home media gateway at a scheduled time.

9. A system for facilitating remote downloading, comprising:

an interface configured to:

receive, at a home media gateway associated with at least a first endpoint, a remote download request generated by a web browser running on the first endpoint and relayed to the home media gateway via at least one component of a wireless service provider's network, the remote download request received through a wireless service provider network control signaling connection established between the home media gateway and the first endpoint, the wireless service provider providing user authentication for the remote download request, the remote download request comprising an address associated with at least one file hosted by a remote server; and receive, at the home media gateway, the at least one file from the remote server; and a processor configured to detect a presence of the first endpoint, wherein upon detecting the presence of the first endpoint, the interface is further configured to send the at least one file from the home media gateway to the first endpoint.

10. The system of claim 9, wherein, upon completing the receiving of the at least one file, the interface is further configured to send a message to the endpoint indicating that the home media gateway has completed receiving the at least one file.

11. The system of claim 9, wherein:

the remote download request is received from the first endpoint while the first endpoint is away from a home location and using a wireless connection; and the at least one file is received at the home location via a network access connection associated with a user of the first endpoint, the network access connection different than the wireless connection.

12. The system of claim 9, wherein the remote download request comprises security credentials.

13. A system for facilitating remote downloading, comprising:

an interface configured to receive a request to download at least one file from a remote server; and a processor configured to generate from a web browser a remote download request comprising an address associated with the at least one file;

the interface further configured to:

transmit the remote download request to a home media gateway via at least one component of a wireless service provider's network, the remote download request transmitted through a wireless service provider network control signaling connection established between the home media gateway and the interface, the wireless service provider providing user authentication for the remote download request; and receive the at least one file from the home media gateway.

14. The system of claim 13, wherein the remote download request further comprises security credentials.

15. The system of claim 13, wherein the processor is further configured to determine that a time to receive the at least one file exceeds a first threshold.

16. The system of claim 13, wherein the interface configured to receive the at least one file is further configured to receive the at least one file from the home media gateway at a scheduled time.

17. One or more computer-readable non-transitory storage media embodying software that when executed by a processor is operable to:

receive, at a home media gateway associated with at least a first endpoint, a remote download request generated by a web browser running on the first endpoint and relayed to the home media gateway via at least one component of a wireless service provider's network, the remote download request received through a wireless service provider network control signaling connection established between the home media gateway and the first endpoint, the wireless service provider providing user authentication for the remote download request, the remote download request comprising an address associated with at least one file hosted by a remote server;

receive, at the home media gateway, the at least one file from the remote server;

upon detecting a presence of the first endpoint, send the at least one file from the home media gateway to the first endpoint.

18. The media of claim 17, wherein, upon completing the receiving of the at least one file, the software, when executed by the processor, is further operable to send a message to the endpoint indicating that the home media gateway has completed receiving the at least one file.

19. The media of claim 17, wherein:

the remote download request is received from the first endpoint while the first endpoint is away from a home location and using a wireless connection; and the at least one file is received at the home location via a network access connection associated with a user of the first endpoint, the network access connection different than the wireless connection.

20. The media of claim 17, wherein the remote download request comprises security credentials.

21. One or more computer-readable non-transitory storage media embodying software that when executed by a processor is operable to:

receive a request to download at least one file from a remote server;

generate from a web browser a remote download request comprising an address associated with the at least one file;

transmit the remote download request to a home media gateway via at least one component of a wireless service provider's network, the remote download request transmitted through a wireless service provider network control signaling connection established between the home media gateway and the first endpoint, the wireless service provider providing user authentication for the remote download request; and receive the at least one file from the home media gateway.

22. The media of claim 21, wherein the remote download request further comprises security credentials.

23. The media of claim 21, wherein the software, when executed by a processor, is further operable to determine that a time to receive the at least one file exceeds a first threshold.

24. The media of claim 21, wherein receiving the at least one file comprises receiving the at least one file from the home media gateway at a scheduled time.

* * * * *